Sept. 2, 1969  K. MAURER  3,464,438
CONTROL DEVICE
Filed Oct. 10, 1966

INVENTOR.
Klemens Maurer
BY
Darbo, Robertson &
Vandenburgh
Attys

United States Patent Office 3,464,438
Patented Sept. 2, 1969

3,464,438
CONTROL DEVICE
Klemens Maurer, Solingen, Germany, assignor to Sunvic-Regler GmbH, Solingen-Wald, Germany
Filed Oct. 10, 1966, Ser. No. 585,445
Claims priority, application Austria, Oct. 12, 1965, A 9,206/65
Int. Cl. G05d 7/03; F16k 31/04
U.S. Cl. 137—487.5    11 Claims

ABSTRACT OF THE DISCLOSURE

A control device has a measuring sensor which produces an output of pulse sequence signals indicative of the value of the output value. The input or setpoint value is also represented by pulse sequence signals. A comparator receives these two signals and produces an output which is, figuratively speaking, plus or minus depending upon whether or not the measured signal is above or below the setpoint signal. The comparator output is amplified and drives a stepping motor. Through an interchangeable gear train the motor controls the angular position of a pivoted lever movable about an adjustable pivot point. An analogue value transmitter takes the form of pressure regulaor having a diaphragm loaded by a spring. The angular position of the lever controls the loading on the spring. The transmitter gives a pressure output which, through a controller, adjusts a final control element in the form of a diaphragm valve.

---

Figure 1:
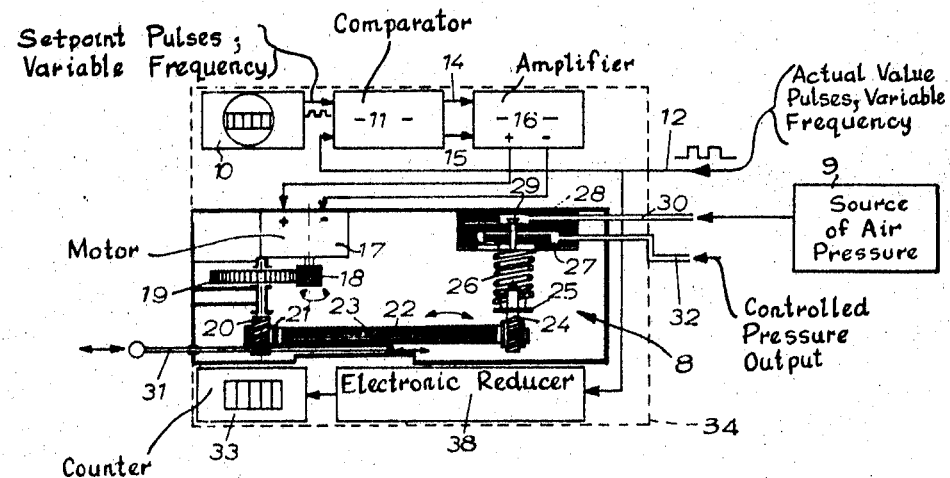

This invention relates to a control device wherein actual value and setpoint value are represented by pulse sequences.

Control devices of the type indicated are known wherein actual value and setpoint value are supplied to respective motors. For differentiation, both motors drive parts of a mechanical differential gear mechanism. The driven shaft of the differential gear mechanism determines the controller output. An arrangement of the type indicated has the advantage that the controller output is not only determined by the error but by the time integral thereof. The controller will now tend not only to make the error zero but the time integral thereof, thus, to make the areas on the one hand below the actual value course above the setpoint value line and on the other hand above the actual value course and below the setpoint value line equal to each other for a longer period of time. This equalization of the time integrals takes place when there is actually a strict integration in the controller. In a servomotor controlled by an analog voltage the integration is generally effected only approximately. The suppression of the time integral of the error is of significance to a controlled system wherein the controlled variable is a fluid flow which shall be kept constant. Then for instance, in mixing installations it is not the instantaneous fluid flow that is of interest but the amount of flow for a longer period of time. An instantaneous error of the fluid flow can be put up with if the amount is correct when measured over a longer period of time. Therefore, a controller of the present type may perhaps be adjusted "more softly" than would be required if it was intended to control the fluid flow itself within the narrow limits required. Such a softly adjusted controller will have less tendancy to hunt than a "rigidly" adjusted controller.

It is the object of this invention to provide a controller having a good long-time accuracy, thus, wherein the time mean value of the error is minimized over longer periods of time.

It is a further object of this invention to design the controller for this purpose in a manner such that it effects a strict time integration of the error so that errors upwardly and downwardly are properly averaged out in time.

Finally, it is the object of this invention to attain these objects with the least possible apparatus.

The invention is characterized by a circuit for producing a pulse sequence corresponding to the difference of the numbers of actual value-pulses and setpoint value-pulses, and by a stepping motor controlled by this pulse sequence, whereby the output of an analog value transmitter is variable as output quantity of the control device.

The digital inputs and the stepping motor are effective to carry out a strict time integration of the error whereby a good longtime control accuracy is attained. The apparatus required for this purpose is relatively small. Only one single stepping motor is required which steps on with each pulse by a strictly defined path, the total path of the motor being proportional to the number of pulses, and therewith to the time integral of the pulse frequency. This, however, strictly corresponds to the difference in the frequencies of setpoint value and actual value. A circuit for this differentiation can be made with relatively little apparatus. A preferred circuit of the type indicated being designed with six pulse gates and two-1-bit-storage elements is described in the copending patent application of the applicant relating to "Circuit for Digital Differentiation," Ser. No. 585,444, filed Oct. 10, 1966. The stepping motor acts as a storage element for the time integral of the error and controls an analog output. This may be an electrical output, the stepping motor then adjusting, for example, a potentiometer.

Another alternative consists in that the analog value transmitter is a diaphragm pressure regulator in a flow of pressure medium, wherein the bias of the diaphragm loading spring is variable by the stepping motor.

The analog outpot can, of course, only vary within specific limits, for instance, from 1.2 to 1 kp./cm.$^2$ (kp.=kilopond). The capacity of the "storage element," that is the number of pulses which can be supplied to the stepping motor until one of these limits is reached, is dependent on the transmission between the stepping motor and the analog value transmitter. With the arrangement according to the invention this storage capacity may readily be adapted to the specific conditions of the controlled system, when in further modification of the invention, variable gearing means are provided between stepping motor and analog value transmitter for adaption to different controlled systems. Such an adaption of storage capacity is practically impossible with strictly digital controllers wherein the storage element is designed, say, of flip-flops.

In a controller of the present type the stepping motor and the analog value transmitter will be in some intermediate position at the beginning, where the pneumatic analog value transmitter, for instance, yields an output pressure of 0.6 kp./cm.$^2$. This output pressure may be supplied to a final control element, such as, for instance, a diaphragm valve. To attain the setpoint value adjusted at the controller, a completely different output pressure may possibly be required at the diaphragm valve, for instance, a pressure of 0.8 kp./cm.$^2$. Thus, the stepping motor and "storage element" must first be deflected to a position which corresponds to an output pressure of 0.8 kp./cm.$^2$, that is to say, that for a certain period of time there must exist a deviation of actual value and setpoint value from each other, which affects such a deflection. However, in contrast to later control hunting about the setpoint value then attained this deviation is not averaged out again. In many cases the error is immaterial. In a flow-rate control it corresponds, say, to a certain amount of material which is the less irrelevant the longer runs the equipment. However, for temporarily operating controlled systems such an error may possibly be disturbing.

In further modification of this invention provision may therefore be made that the output of the analog value transmitter is supplied to the actual value input of a controller connected therebehind, that the setpoint value input of this controller corresponds to a predetermined mean initial value of the analog value storage output, and that the output of this controller controls the final control element.

Thus, the controller is effective to vary the correcting quantity in a manner such that the storage capacity corresponding to the time integral of the error becomes zero, a prerequisite thereof, of course, being that the error itself is suppressed, for an error would, in the course of time result in a deviation also of the time integral thereof from the initial value.

Figure 2:
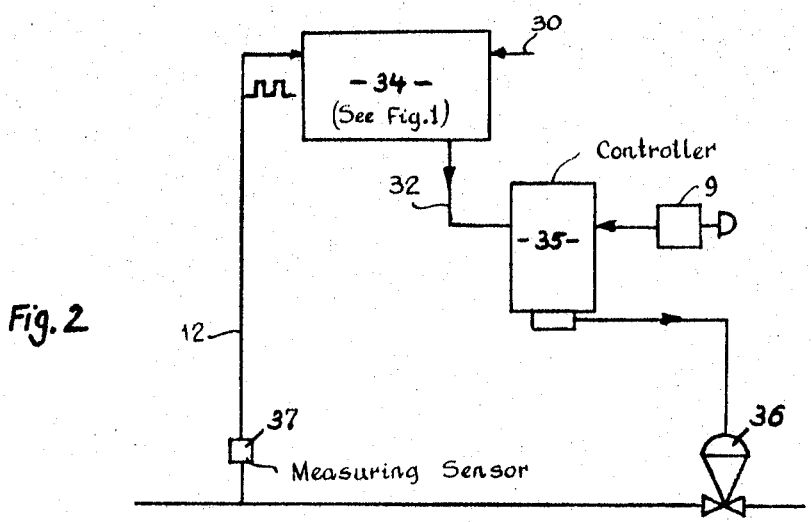

An embodiment of the present invention is presented in the drawings and described as follows:

FIG. 1 illustrates schematically the design of a control device of the invention; and FIG. 2 illustrates an arrangement wherein the storage capacity is controlled to a predetermined initial value by a controller connected therebehind.

A setpoint value transmitter 10 supplies a pulse sequence with a frequency corresponding to the setpoint value (for instance between 0 and 100 cycles or 0 and 200 cycles) to a circuit 11 for the comparison of setpoint value and actual value. This current has simultaneously supplied thereto a pulse sequence with a frequency corresponding to the actual value via an input 12. Circuit 11 supplies a pulse sequence either at an output 14 or at an output 15, the medium frequency of which corresponds to the difference in the frequencies of actual value-input 12 and setpoint value transmitter 10. Circuit 11 has one 1-bit storage element as well as three pulse gates for each input 10, that is for the setpoint value-input and the actual value-input 12. The pulse gates are controlled by the storage elements in a manner such that each pulse appearing at an input first tends to cancel the pulse which is stored in the storage element associated with the other input. When no pulse was stored there, the pulse tends to set the storage element associated with its own input. Only when this is not possible since a pulse was already stored in this storage element, the pulse is allowed to pass through to the one output. This is described in greater detail in the aforesaid application Ser. No. 585,444, filed Oct. 10, 1966.

The output pulses of the comparison circuit 11 are supplied to an amplifier 16 for a stepping motor 17 either via output 14 or output 15, depending on which value is the greater one, and this stepping motor is stepped on accordingly rightwardly or leftwardly.

The stepping motor 17 drives a threaded spindle 20 through a gear mechanism comprising the gear wheels 18 and 19. A nut 21 is guided on this threaded spindle 20. The nut 21 is secured to the end of a lever 22 which is pivoted about a pivot point 23. The other end of the lever 22 has a spring plate 25 secured thereto by means of an adjusting spindle 24 hinged on the lever.

An analogue value transmitter generally 8 is formed by a pressure regulating valve including diaphragm loading spring 26 is supported on the spring plate 25. Spring 25 loads the regulating diaphragm 27 of a diaphragm pressure regulator 28. The regulating diaphragm 27 has a valve body 29 connected thereto which restricts a compressed air current supplied as at conduit 30 from source 9 so that the output pressure thereof (at conduit 32) counterbalances the bias of the spring 26. By pivoting the lever 22 the bias of the spring, and therewith the output pressure are changed proportionally. This output pressure may, for example, directly control a diaphragm valve or another final control element.

To be able to adapt the controller to the different controlled systems, the gear mechanism 18, 19 is adapted to be readily exchangeable. Furthermore, by shifting the pivot point by control rod 31 connected thereto, the lever transmission ratio is variable in a 1:5 ratio. Therewith, the storage capacity can be changed, that is the number of differential pulses which are required to bring the analog output at 32 to one of the limit values.

The actual value pulses (line 12) are furthermore supplied to an electromechanical pulse counter 33 via an electronic reducer 38. Thus, this counter indicates digitally the time integral of the actual value. When the actual value is a fluid flow in a conduit, then, the counter 33 indicates the total amount flowing through the conduit. This may, for instance, also involve the measurement of a heat flow, and accordingly, the counter 33 will indicate an amount of heat.

FIG. 2 illustrates the application of the arrangement of FIG. 1, which is referenced there 34, in connection with a controller 35 connected therebehind which is supplied with the output of the control device 34 ("stored value") as actual value-input. The setpoint value-input of the controller 35 (fluid amplifier) has supplied thereto a value which corresponds to the initial value of the output pressure from the control device 34, for instance, 0.6 kp./cm.$^2$. The output of the controller 35, which is an amplified function of the output pressure at 32, controls a diaphragm valve 36. The digital output of a measuring sensor 37 is supplied to the input of the control device 34. Thus, the controller 35 is effective to cause a control to the effect that the time integral of the error is zero.

The invention is claimed as follows:

1. In a control device wherein the actual value and the setpoint value are represented by pulse sequence signals, the improvement comprising:

circuit means connected to receive said signals and to produce output pulse sequence signals corresponding to the difference of the numbers of actual value pulses and setpoint value pulses; a stepping motor connected to said circuit means and having an output shaft positionally controlled by said output signals; an analogue value transmitter having an output; and mechanical means connecting the motor and the transmitter to set the analogue value transmitter as a function of the shaft position.

2. In a control device as set forth in claim 1, wherein said mechanical means includes interchangeable gearing whereby the relationship of the output of the analogue value transmitter to output pulse sequence signals may be readily changed to adapt the device to different control systems.

3. In a control device as set forth in claim 2, wherein said analogue value transmitter is a fluid pressure regulator having a diaphragm and a control spring biasing said diaphragm, said mechanical means being operatively associated with the control spring to adjust the bias on the diaphragm in response to the position of the stepping motor.

4. In a control device as set forth in claim 3, wherein said mechanical means includes a spindle, said gearing connecting said motor shaft and said spindle, a nut on said spindle with the linear position of the nut being controlled by the rotation of the spindle, and a pivoted lever, said nut being connected to the lever to control the angular position thereof, the bias on the control spring being adjusted by the angular position of the lever.

5. In a control device as set forth in claim 4, wherein the mechanical means includes an adjustable pivot point for the lever whereby the ratio of the movement of the nut to the extent of biasing of the diaphragm may be varied.

6. In a control device as set forth in claim 5, including a final control element and a controller connected to the final control element to regulate the same, said transmitter having an output connected to the controller to adjust the setpoint value input of the controller corresponding to a mean initial value of the analogue value storage output as represented by the urging of said diaphragm.

7. In a control device as set forth in claim 1, wherein said mechanical means includes a pivoted lever and rotatable means interconnecting the lever and the motor shaft to control the angular position of the lever in response to the position of the shaft, said lever having an operative connection with the transmitter to control the transmitter in response to the angular position of said connection of the lever.

8. In a control device as set forth in claim 7, wherein said mechanical means includes adjustment means for selectively varying the ratio of the movement of the motor shaft to the change in angular position of said connection of the lever.

9. In a control device as set forth in claim 8, wherein said analogue value transmitter is a fluid pressure regulator having a diaphragm and a control spring, said connection of the lever being operatively associated with the control spring to adjust the bias on the diaphragm in response to the position of the stepping motor.

10. In a control device as set forth in claim 7, wherein said analogue value transmitter is a fluid pressure regulator having a diaphragm and a control spring, said connection of the lever being operatively associated with the control spring to adjust the bias on the diaphragm in response to the position of the stepping motor.

11. In a control device as set forth in claim 1, wherein said circuit means has two inputs and two outputs, one input being connected to receive the actual value pulse sequence signals and the other input being connected to receive the setpoint value pulse sequence signals, said circuit means producing a pulse at one output when the setpoint value pulses exceed in number the number of the actual value pulses and to produce a pulse at the other output when the actual value pulses exceed in number the number of the setpoint value pulses, said outputs being connected to said stepping motor to drive the motor shaft in one direction with a pulse at one output and to drive the shaft in the other direction with a pulse at the other output.

References Cited

UNITED STATES PATENTS

| | | | |
|---|---|---|---|
| 3,174,504 | 3/1965 | Rosenbrock et al. | 137—487.5 XR |
| 3,222,996 | 12/1965 | Thieme et al. | 137—596.17 XR |

M. CARY NELSON, Primary Examiner

R. J. MILLER, Assistant Examiner

U.S. Cl. X.R.

318—28

UNITED STATES PATENT OFFICE
CERTIFICATE OF CORRECTION

Patent No. 3,464,438           Dated September 2, 1969

Inventor(s) Klemens Maurer

It is certified that error appears in the above-identified patent and that said Letters Patent are hereby corrected as shown below:

Column 1, line 25, "regulaor" should read -- regulator --. Column 2, line 37, "1.2" should read -- 0.2 --; line 66, "affects" should read -- effects --. Column 3, line 29, "current" should read -- circuit --.

Signed and sealed this 1st day of December 1970.

(SEAL)
Attest:

EDWARD M. FLETCHER, JR.           WILLIAM E. SCHUYLER, JR.
Attesting Officer                      Commissioner of Patents